Oct. 30, 1962 V. J. SAWDON 3,061,173
COMBINED ENVELOPE AND DETACHABLE RETURN CARD
Filed Sept. 13, 1957 6 Sheets-Sheet 1
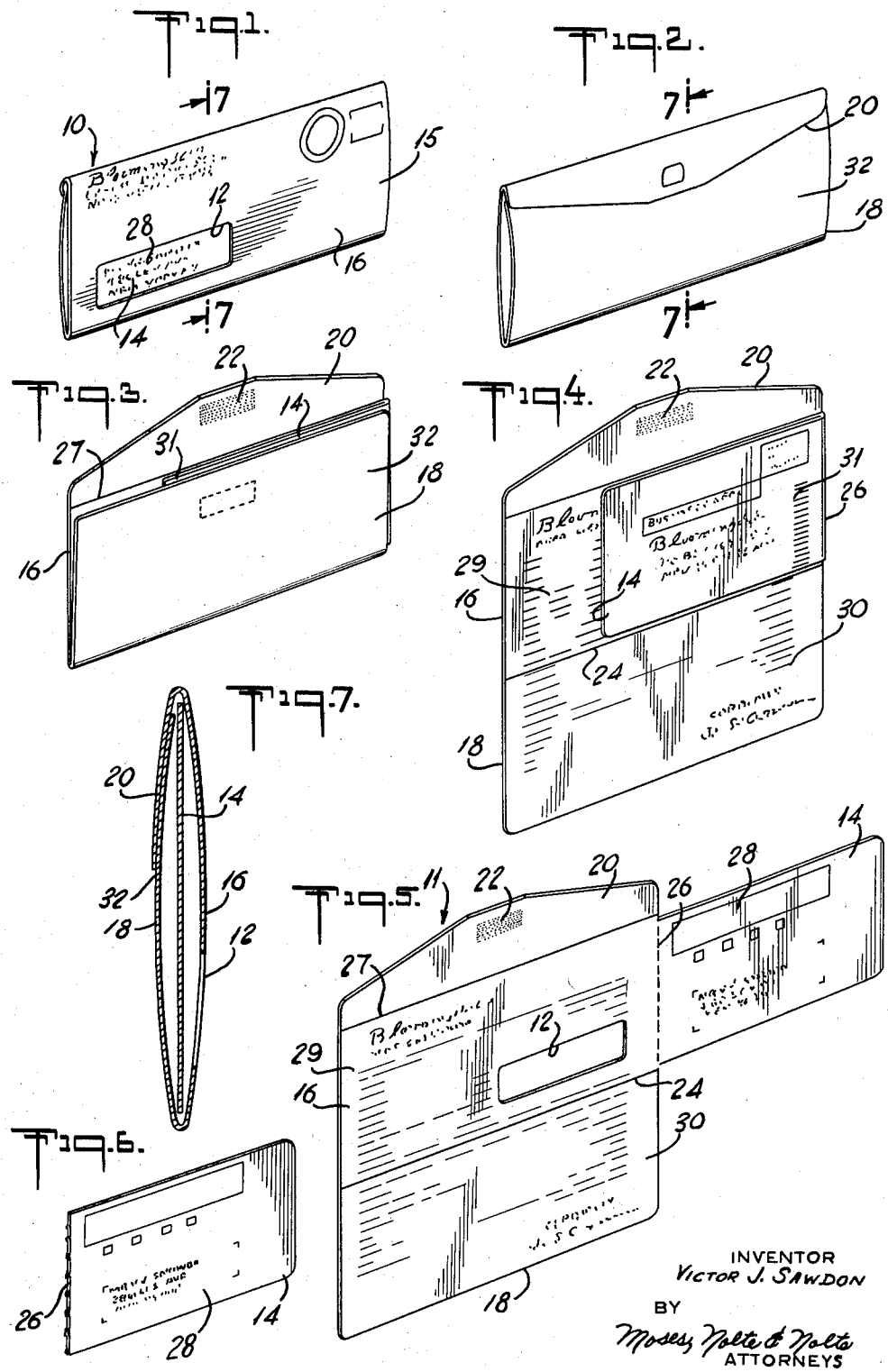
INVENTOR
VICTOR J. SAWDON
BY
Moses, Nolte & Nolte
ATTORNEYS

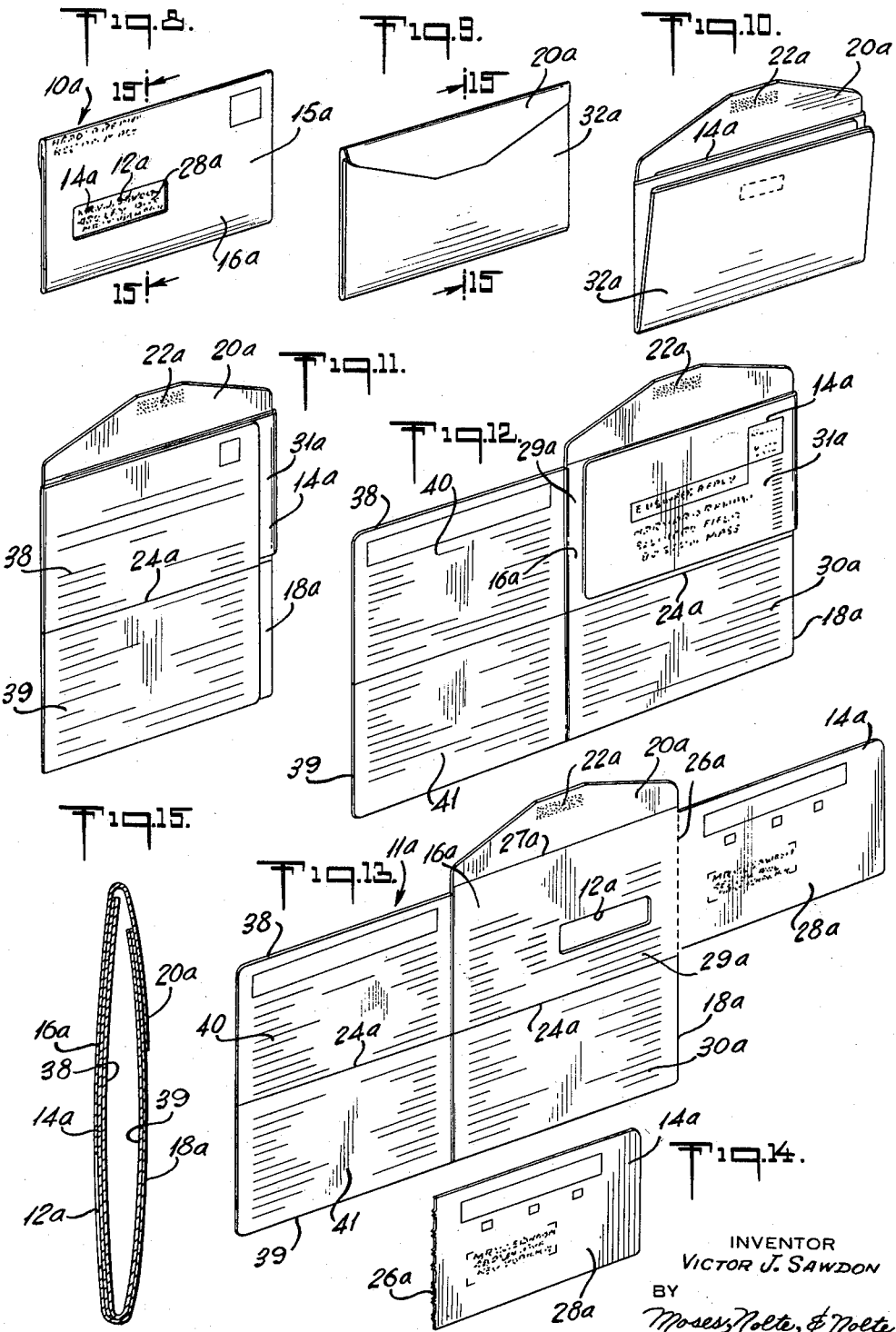

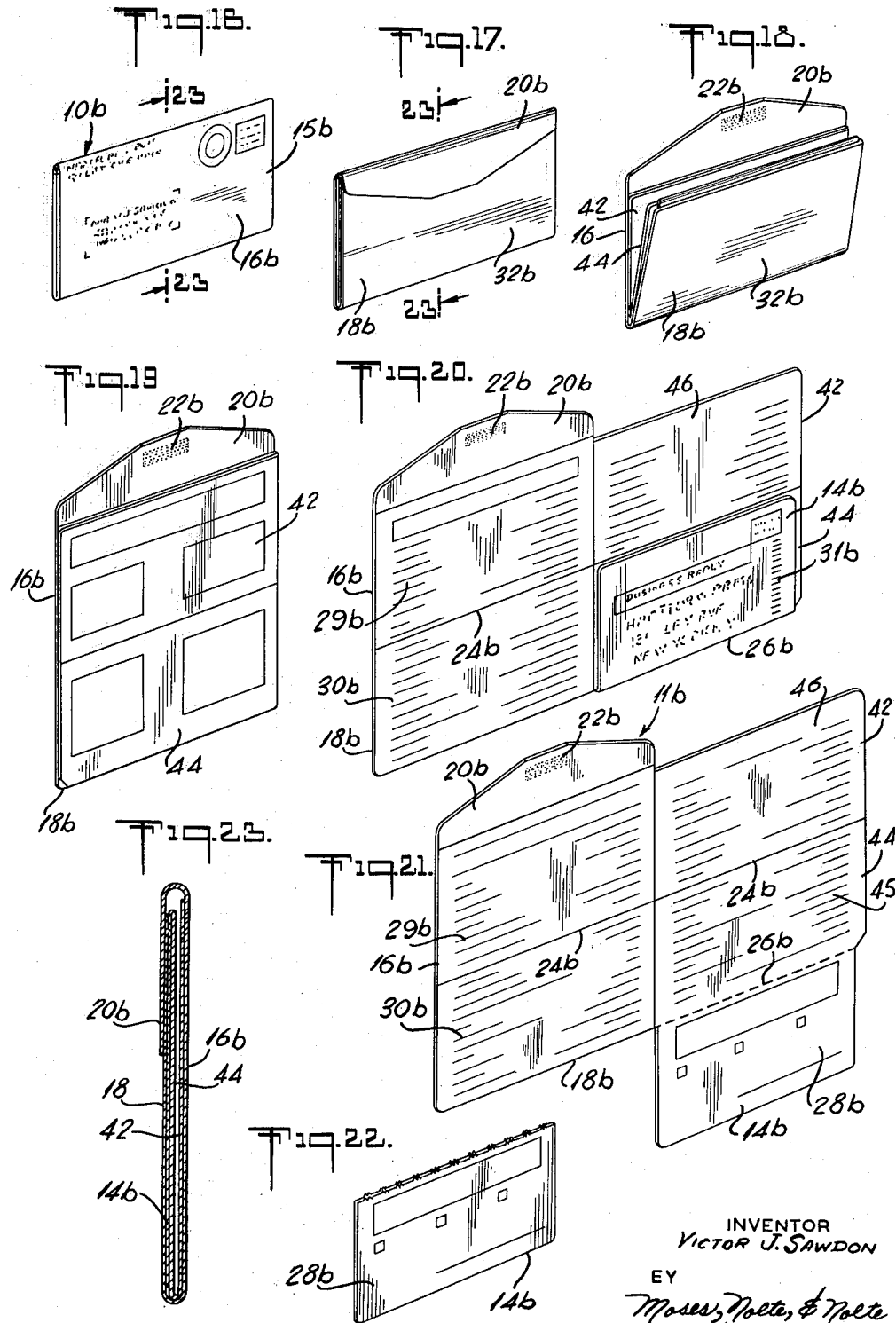

Oct. 30, 1962 V. J. SAWDON 3,061,173
COMBINED ENVELOPE AND DETACHABLE RETURN CARD
Filed Sept. 13, 1957 6 Sheets-Sheet 4
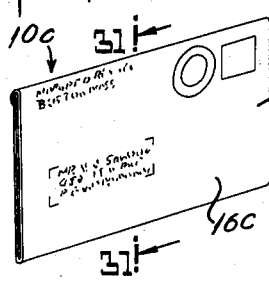
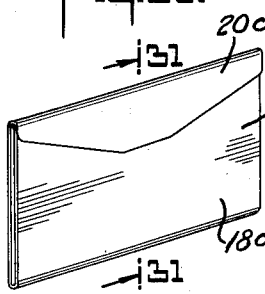
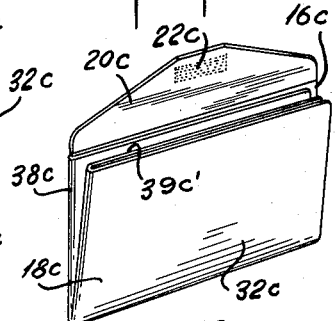
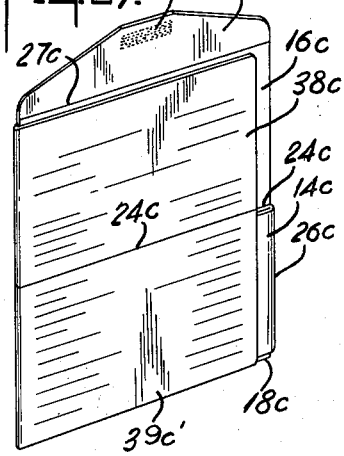
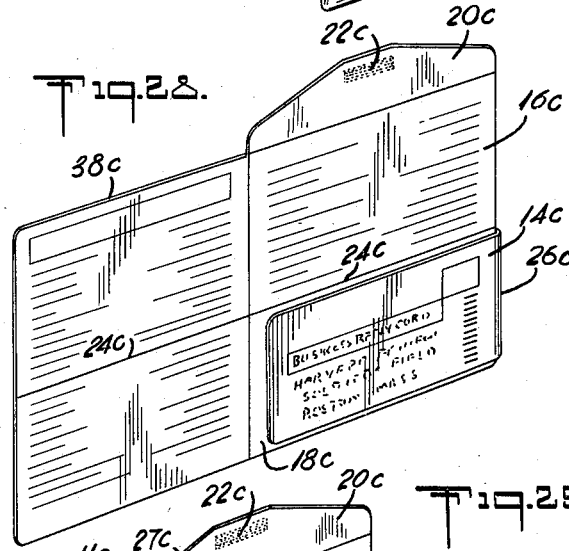
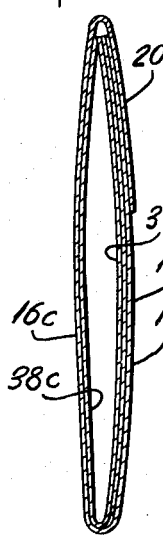
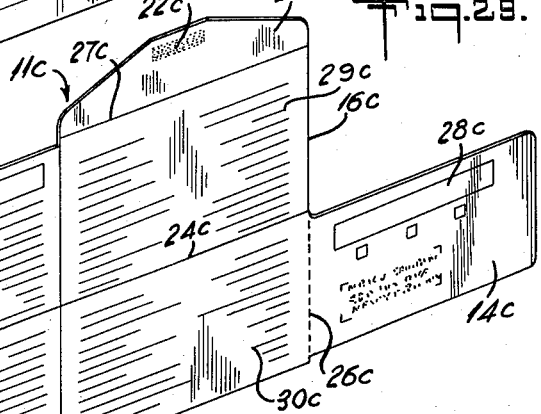
INVENTOR
VICTOR J. SAWDON
BY
Moses, Nolte & Nolte
ATTORNEYS Oct. 30, 1962 V. J. SAWDON 3,061,173
COMBINED ENVELOPE AND DETACHABLE RETURN CARD
Filed Sept. 13, 1957 6 Sheets-Sheet 5
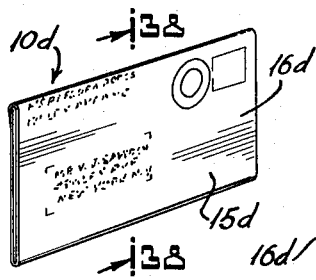
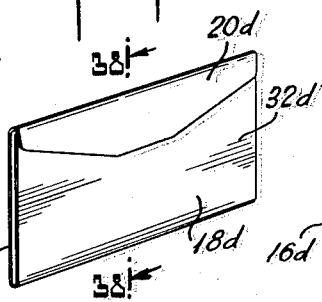
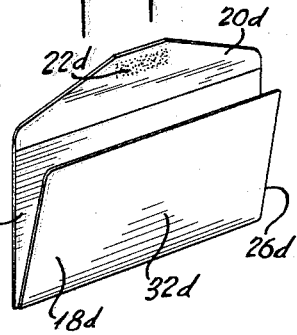
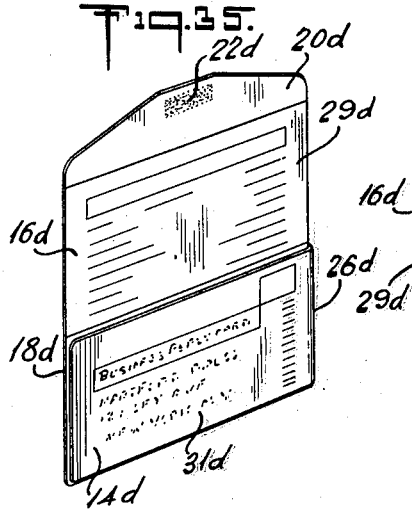
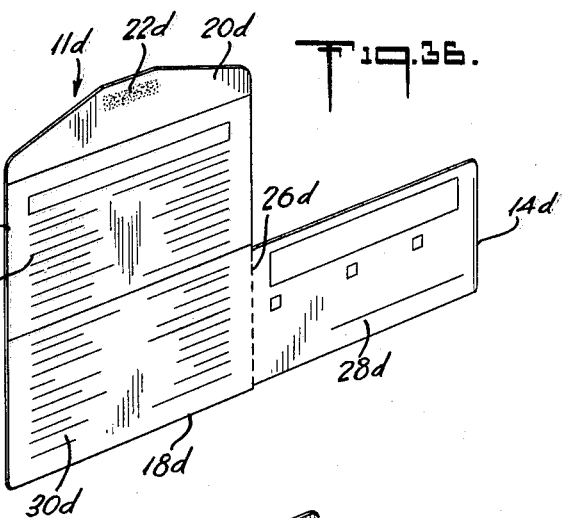
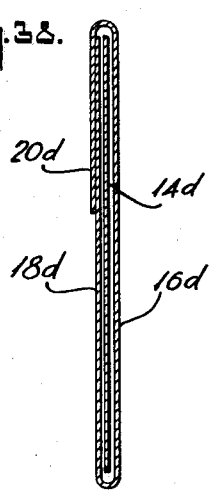
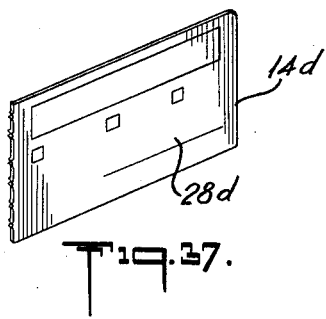
INVENTOR
VICTOR J. SAWDON
BY
Moses, Nolte, & Nolte
ATTORNEYS

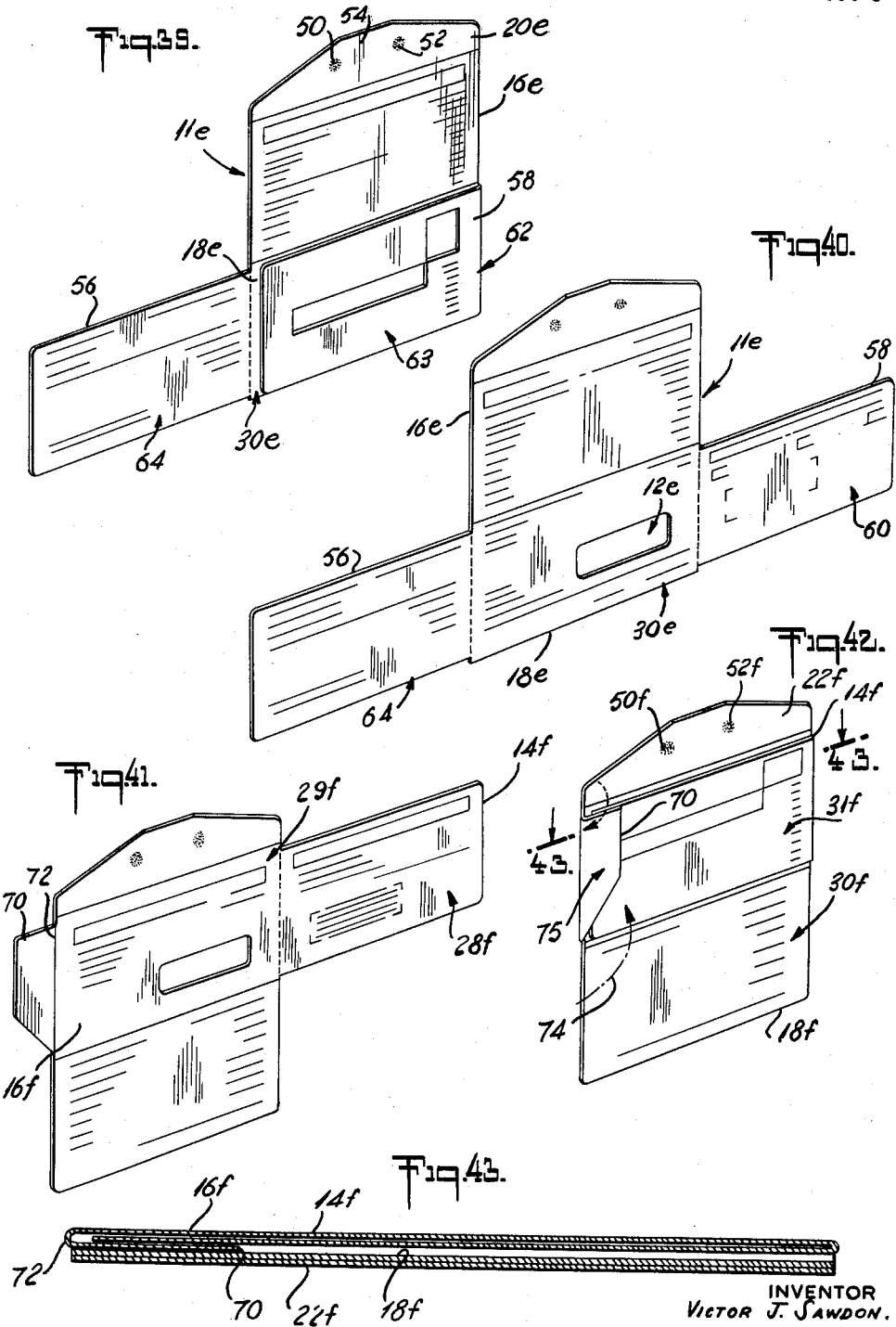

United States Patent Office 3,061,173
Patented Oct. 30, 1962

3,061,173
COMBINED ENVELOPE AND DETACHABLE
RETURN CARD
Victor J. Sawdon, New York, N.Y., assignor to Card-Velope R.S.V.P., New York, N.Y., a partnership of New York
Filed Sept. 13, 1957, Ser. No. 683,914
2 Claims. (Cl. 229—73)

This invention relates to an envelope and detachable card combination formed from a one piece unit wherein the card portion of the unit, after the unit is folded to form the envelope, is contained within the envelope.

It is an object of this invention to provide an envelope and detachable card combination, formed from a one piece unit or body blank of paper or other suitable material, where a pictorial representation or printed message is printed or otherwise suitably affixed to the envelope portion of the unit so as to be on the inner or outer, or both, surfaces of the envelope after the unit is folded to form the envelope and wherein the card contained within the envelope, formed by folding, carries copy for orders, inquiries, acknowledgements or other information, either with or without a returnable address of postal indicia or wherein the card is a plain card without printing thereon.

It is yet another object of the present invention to provide a one piece unit adapted to be folded into an envelope so that the detachable card portion of the unit is contained within the envelope so formed which is particularly useful in soliciting magazine and newspaper subscriptions, charitable fund raising appeals, mail order sales, soliciting information, inquiries by mail or other means in general for use whenever a return card works to the best advantage of either the addressor or recipient, which may be delivered to the customer or user printed, folded, sealed and ready for addressing, or which may also be delivered not printed, unfolded and unsealed with or without remoistening gum flap for sealing the closing flap if desired.

It is still another object of the present invention to provide a one piece unit adapted to be folded into an envelope so that the detachable card portion of the unit is contained within the envelope so formed which is particularly useful in soliciting magazine and newspaper subscription, charitable fund raising appeals, mail order sales, soliciting information, inquiries by mail or other means and in general for use whenever a return card works to the best advantage of either the addressor or recipient.

It is yet another object of the present invention to provide a one piece unit adapted to be folded into an envelope so that the detachable card portion of the unit is contained within the envelope so formed where the recipient's address may be affixed directly to the envelope portion of the unit so as to appear on either the front or back face of the envelope formed by folding the unit and wherein this address may be printed either before or after the envelope has been formed by folding.

It is still another object of the present invention to provide for payment of postage by printed postal indicia, metered postage or postage stamps on either the envelope portion of the unit or on the return card, where the card is to be returned by the recipient through the mails, or on both, either before or after the one piece unit has been folded to form the envelope.

It is yet a further object of the present invention to provide a window or cut-out opening on either the front or back surface of the envelope portion of the unit so that a surface of the card which is contained within the envelope formed from the unit by folding will be exposed whereby the recipient's address may be printed or suitably affixed to the outgoing envelope and/or return card with adhesive label or other addressing device or scheme.

It is still a further object of the present invention to provide the one piece unit with a plurality of integrally joined panels which may have printed on one or more sides thereof advertising material, and which panels will be contained within the envelope formed by folding of the unit.

It is yet a further object of the present invention to provide a plurality of detachable cards integrally joined to a portion of the unit, all of the cards adapted to be contained within the envelope after the unit is folded to form the envelope.

It is still another object of the present invention to provide a return address on a surface of at least one of the detachable cards and to suitably affix the recipient's address to another surface of the same detachable card either by affixing the recipient's address on the card before forming the unit into an envelope or by suitably affixing the recipient's address through the hereinabove described cut out portion of the surface of the envelope formed by folding, so that when the return card is received by the original addressee or addressor of the return card, he will have an accurate check upon the promotional value of his mailing.

It is yet another object of the present invention when using a plurality of cards to provide a piece of carbon detachably connected between at least two of the cards so that when the recipient receives the unit he may indicate on one of the return cards his reply and will by means of the carbon provide for himself a duplicate copy of the information forwarded on the return card.

It is still a further object of the present invention to provide the envelope portion of the unit with an additional flap integrally joined to the unit adapted to be folded within the envelope and over the enclosed card or cards whereby at least one surface of the card or cards may not be exposed to view without complete opening of the envelope itself, thereby providing a "peek proof" envelope particularly adapted for the transmission of private or confidential information.

It is yet a further object of the present invention to provide at least two independent sealing points on the main flap of the envelope portion of the unit whereby the seal flap will be easier to open and access to the interior of the envelope gained with a minimum of inconvenience.

Other objects of the present invention are to provide a combined outgoing envelope, printed message and detachable return card, bearing the above objects in mind, which is of simple construction, inexpensive to manufacture, fabricated from a single unit, easy to use, and efficient in achieving its intended purpose. For other objects and a better understanding of the invention, reference may be had to the following detailed description taken in connection with the accompanying drawings in which:

FIG. 1 is a front perspective view of the invention shown folded and sealed for mailing as an outgoing envelope;

FIG. 2 is a rear perspective view of the invention shown folded and sealed for mailing as an outgoing envelope;

FIG. 3 is a rear perspective view of the invention shown folded but not sealed;

FIG. 4 is a perspective view of the invention showing the return card folded into position but with a portion of the outgoing envelope unfolded;

FIG. 5 is a perspective view of the invention showing the invention unfolded and unsealed and is likewise an inside view of the invention after it has been opened by the addressee;

FIG. 6 is a perspective view of the detachable card, after it has been completely detached from the invention as shown in FIG. 5, ready for use as a return card;

FIG. 7 is a sectional view taken along the line 7—7 of FIGS. 1 and 2;

FIG. 8 is a front perspective view of a modification of the invention;

FIG. 9 is a rear perspective view of the modification illustrated in FIG. 8 showing the invention folded and sealed for mailing;

FIG. 10 is a perspective view showing the modification illustrated in FIG. 8 folded as an outgoing envelope but not sealed;

FIG. 11 is a perspective view of the envelope modification shown in FIG. 8 with its bottom flap folded downwardly;

FIG. 12 is a perspective view of the modification shown in FIG. 8 with the covering flap unfolded;

FIG. 13 is a perspective view of the modification shown in FIG. 8 showing the invention before it has been folded into an outgoing envelope and likewise showing the inside perspective view of the invention after it has been received by the addressee;

FIG. 14 is a perspective view of the detachable card, after it has been completely detached from the invention as shown in FIG. 13, ready for use as a return card;

FIG. 15 is a sectional view taken along the line 15—15 of FIGS. 8 and 9;

FIG. 16 is a front perspective view of another modification of the invention;

FIG. 17 is a rear perspective view of the modification illustrated in FIG. 16 showing the invention folded and sealed for mailing;

FIG. 18 is a perspective view showing the modification illustrated in FIG. 16 folded as an outgoing envelope but not sealed;

FIG. 19 is a perspective view of the envelope modification shown in FIG. 16 with its bottom flap folded downwardly;

FIG. 20 is a perspective view of the modification shown in FIG. 16 with the covering flap unfolded;

FIG. 21 is a perspective view of the modification shown in FIG. 16 showing the invention before it has been folded into an outgoing envelope and likewise showing the inside perspective view of the invention after it has been received by the addressee;

FIG. 22 is a sectional view showing the detachable card, after it has been completely detached from the invention as shown in FIG. 21, ready for use as a return card;

FIG. 23 is a sectional view taken along the line 23—23 of FIGS. 16 and 17;

FIG. 24 is a front perspective view of still another modification of the invention;

FIG. 25 is a rear perspective view of the modification illustrated in FIG. 24 showing the invention folded and sealed for mailing;

FIG. 26 is a perspective view showing the modification illustrated in FIG. 24 folded as an outgoing envelope but not sealed;

FIG. 27 is a perspective view of the envelope modification shown in FIG. 24 with its bottom flap folded downwardly;

FIG. 28 is a perspective view of the modification shown in FIG. 24 with the covering flap unfolded;

FIG. 29 is a perspective view of the modification shown in FIG. 24 showing the invention before it has been folded into an outgoing envelope and likewise showing the inside perspective view of the invention after it has been received by the addressee;

FIG. 30 is a sectional view showing the detachable card, after it has been completely detached from the invention as shown in FIG. 29, ready for use as a return card;

FIG. 31 is a sectional view taken along the line 31—31 of FIGS. 24 and 25;

FIG. 32 is a front perspective view of still another modification of the invention;

FIG. 33 is a rear perspective view of the invention illustrated in FIG. 32 shown folded and sealed for mailing as an outgoing envelope;

FIG. 34 is a rear perspective view of the invention illustrated in FIG. 32 shown folded but not sealed;

FIG. 35 is a perspective view of the invention illustrated in FIG. 32 showing the return card folded into position but with a portion of the outgoing envelope unfolded;

FIG. 36 is a perspective view of the invention illustrated in FIG. 32 showing the invention unfolded and unsealed and is likewise an inside view of the invention after it has been opened by the addressee;

FIG. 37 is a perspective view of the detachable card, after it has been completely detached from the invention as shown in FIG. 36, ready for use as a return card;

FIG. 38 is a sectional view taken along the line 38—38 of FIGS. 32 and 33;

FIG. 39 is a perspective view of a modification of the invention showing two detachable cards, one of the cards being in a folded position;

FIG. 40 is a perspective view before folding of the modification shown in FIG. 39 wherein the envelope upon being folded is adapted for use as a pictorial envelope;

FIG. 41 is a perspective view of a modification of the invention having a securing side flap;

FIG. 42 is a perspective view of the modification shown in FIG. 41 after the envelope has been partially folded; and FIG. 43 is a sectional view taken along the line 43—43 of FIG. 42.

The invention generally comprises an outgoing folder or envelope, on the inner surfaces of which a message is printed or otherwise suitably affixed combined with a return card upon which the recipient of the envelope indicates his reply to the printed message. The card and envelope portions are detachably connected by means of machine perforation, pin-hold punched perforation and/or heavy score line in the paper stock so designed that when the envelope is formed, the card is contained within the envelope portion to permit the card to be mailed to the address as an enclosure in the envelope.

Upon receipt of the envelope, the addressee can detach the card from the envelope portion and fill out or not fill out the card, returning it to the addressee without having to address and enclose the card in a return envelope.

In addition, a window may be provided in the front or back face of the envelope, so that the addressee's name can be directly affixed upon the return card after it has been placed within the folded and sealed envelope. In this manner, the name and address of the addressee will appear upon the return card when it is returned to the original sender. In the practice of promotional activities in the present business procedure, it is highly desirable to provide accurate means of measuring the relative merits of promotions by mail. In addition to providing for easy transmission of return cards, with a maximum of convenience to the recipients of promotional literature, the use of direct address printing on the return card provides a method to quickly check the name source without having to decipher scratchy handwriting and of checking the result of a mail campaign without resorting to key numbers, colors, or other present commercial practices.

Referring now more in detail to the drawings, wherein similar reference numerals with subscripts added identify corresponding parts throughout the several views, 10 (FIG. 1) represents a commercial envelope which has been folded into envelope form from a single body unit 11

(FIG. 5) for use as a folded circular letter, order blank, questionnaire, solicitation or the like. Through the front surface 15 of the front panel 16 of the envelope, there is provided a window or opening 12, through which access is free and open to the return card 14 (FIGS. 4–6) which has, in FIG. 1, been folded inside the envelope. This is best seen in FIG. 7 wherein the card 14 is shown between the front panel 16 and rear panel 18 of the formed envelope.

A seal flap 20 (FIGS. 2, 3 and 7) is provided with a glue spot 22 to seal flap 20 over the outer surface 32 of rear panel 18 of the envelope as seen in FIG. 7.

Referring now to FIG. 5, it is seen that the body unit 11 is initially composed of panel 16 and panel 18 adapted to be folded along the score line indicated at 24. Extending laterally from one side of the panel portion 16, which forms the front face of the envelope, is the reference card 14 perforated at its juncture 26 with the panel 16, so as to be easily detached by tearing. All the aforementioned parts 14, 16, 18 and 20 may be made out of a single unit to form the main body portion.

When this one piece unit 11 (FIG. 5) is folded, initially the reference card 14 is folded along perforations 26, so that the face 28 of reference card 14 will be flush against the inner surface 29 of panel 16. This is clearly seen in FIG. 4. After this folding, the panel 18, which becomes the rear panel of the envelope, is folded upwardly as seen in FIGS. 3–4, so that the face 30 of panel 18 will be flush against the surface 31 of the reference card 14. In this manner, the envelope is formed as shown in FIG. 3 and positioned so that the seal flap 20 may be folded along its score line 27 and the glue spot 22 affixed to the surface 32 of panel 18. In this manner, the envelope is formed as shown in FIGS. 1–2.

When the initial folding of return card 14 is made as shown in FIGS. 4 and 5, the address of the recipient of the card could have already been printed or suitably affixed upon the surface 28 of reference card 14, and positioned so that upon folding, this address will appear within the outline of opening 12 or panel 16. However, if desired, this address could be printed or directly suitably affixed on the card 14 after the card has been folded and the envelope fully assembled. This is true since opening 12 allows free and open access to the card 14 when the card is folded into mailing position then wholly or partially sealed or not sealed.

Upon receipt of the envelope card folded unit by the addressee and the envelope is opened, the addressee merely tears off the reference card 14 by ripping along perforations 26. The reference card 14 as seen in FIG. 6 then becomes detached and capable of being transmitted through the mail as an ordinary post card or postal card. For this purpose, the stock of the reference card 14 may be greater thickness than that of the panels 20, 18 and 16 of the envelope in order that the return card will meet the established minimum requirements for post cards, as set forth by the United States Post Office Department.

The face 31 of the return card (FIG. 4) is printed so as to indicate that it is a reply card when return mailing is desired and may or may not have thereon suitable postage and the correct return address so as to relieve the addressee or having to do anything more than merely indicate his assent or dissent to the circular solicitation or promotion.

In normal practice, the inside panel surfaces 29 and 30 (FIG. 5) would have printed or pictorial matter thereon constituting the advertising or information for the recipient of the envelope. This printed matter could be in the form of advertisements, pictorial representations, or other suitable and conventional forms.

The use of the window 12, when the surface 28 is adjacent the surface 15, is an optional structural feature and may, or may not be used as desired, it being understood that the absence or presence of the window 12 is an elective feature fully within the scope of my invention.

FIGS. 8 through 15 show a modification of the invention wherein additional advertising panels 38 and 39 are integrally joined to the panels 29a and 30a so as to form one unit 11a. The reference card 14a of this envelope and card combination is folded against surface 29a and then panels 38 and 39 are folded over the reference card 14a as seen in FIGS. 11–12.

An opening 12a is provided in the surface 15a (FIG. 8) so that the address may be printed or affixed directly on the card as hereinabove discussed.

The modification shown in FIGS. 16 through 23 has a one-piece unit 11b where side panels 42 and 44 have been formed integrally with panels 16b and 18b. Reference card 14b is affixed to a bottom edge of panel 44 and may be detached therefrom by means of perforations 26b.

In the folding of this modification, reference card 14b is folded upwardly so that surface 28b is flush with surface 45 and the panels 42, 44 are folded over against the surfaces 29b, 30b of panels 16b and 18b (FIGS. 19–20).

In this modification, since the surface 28b of card 14b is not disposed adjacent to the surface 29b after the reference card is folded, there is no opening similar to the opening 12 (FIG. 1) in surface 15b. When using this modification, the address is printed or affixed directly on the envelope surface 15b.

The modification of FIGS. 24 through 31 is similar to the modification of FIGS. 8 through 15 hereinabove discussed with the exception that the reference card 14c is integrally joined with the panel 18c rather than 16c. The folding of this modification is the same as that described for the modification of FIGS. 8 through 15. It is noted also, that in this modification, there is no opening in the surface 29c, the address being printed on the surface 15c of the panel 16c rather than appearing on the reference card 14c.

The modification as shown in FIGS. 32 through 38 is identical to that shown in the modification hereinabove described for FIGS. 1 through 7 with the exception that the return card 14d has been detachably mounted to the edge of the panel 18d at 26d. Also the return address is printed or affixed directly upon the outer surface 15d of the envelope 10d.

In this modification, the opening 12 has been eliminated from panel 15d so that the address is printed directly on the surface 15d.

In the modifications illustrated in FIG. 39, the glue spots 50, 52 are placed on the seal flap 20e at two separate places, rather than in the one position as shown in the invention described in FIGS. 1 through 38, inclusive. By using these dual spots 50, 52 one on each side of the seal flap 54, the edge 54, 20e will be free and loose, and will allow for easier and more simple opening of the envelope than does the single glue spot 22 hereinbefore described.

In FIG. 39 there is shown two detachable cards 56, 58 integrally connected at opposite edges of panel 18e of unit 11e, one of which has been folded over the surface 30e of panel 18e. As seen in FIG. 40 the window opening 12e is on panel 18e rather than on the panel 16e. In such an arrangement, a picture or other pictorial representation may be placed upon the front surface of panel 16e, i.e., the surface outwardly visible after the envelope has been formed by folding, and the address or other information, which would be visible through the opening 12e in panel 18e is placed upon the surface 60 of card 58. If desired, one card could be joined to panel 16e without departing from the spirit of my invention.

If desired, a piece of carbon paper smudge or waxed carbonized paper stock or other suitable mechanical device or treated paper for producing a duplicate may be placed between the surfaces 63 of card 58 and the surface 64 of card 56, so that the recipient might, if desired, indicate his reply to information requested on one of the cards, and at the same time might prepare a duplicate record for himself.

In the modification disclosed in FIGS. 41 through 43 a securing flap 70 is integrally connected to an edge 72 of the main panel 16f. A card 14f, similar to that disclosed in the modification of FIGS. 1-7, inclusive, is folded over so that the surface 28f of the card will be flush against the surface 29f of the main panel 16f. At that time, the securing flap 70 is folded along the edge 72 over the rear surface 31f of card 14f. The lower panel 18f is then folded upwardly in the direction of arrow 74 so that its surface 30f will be flush against the surface 31f of the card 14f, and the surface 75 of securing flap 70. Thus flap 70 will be pinched therebetween, as seen in FIG. 43, when the glue spots 50f, 52f seal the panels 18f and 22f in the hereinabove described position. Flap 70 is connected to an edge of one of the body panel units opposite to the edge along which the card is mounted. This flap is greater in length compared to the body panel to which it is attached, however, its width is substantially the same. This may be seen in FIGS. 42 and 43 where the securing flap 70 is shown slightly overlapping the card 14f after it has been folded into position within the envelope unit.

Such a "peek proof" modification is particularly desirable when confidential or private material is to be transmitted by means of the envelope-detachable card combination which is the subject of the instant application.

It being further understood that in the modifications hereinabove shown that the use of additional panels in combination with the double return card modification or with the pictorial style, wherein the opening appears on the lower panel which forms the rear flap of the envelope, may be interchanged as desired, in order to afford the commercial embodiments desired for a particular business use.

While those changes may be made in a detailed construction, it shall be understood that such changes shall be within the spirit and scope of the present invention as defined by the appended claims.

I claim:

1. An envelope and card combination comprising a body unit including a plurality of panels, at least one of said panels having a window cutout, adjacent panels thereof each being interconnected by one fold line, a return card portion connected by another fold line to one of the panels of said body unit, said return card portion having at least a portion thereof which includes a detachable postal return card having a return address area on one side of the card to receive appropriate return address indicia and having a primary delivery address area on the other side of the card to receive the primary delivery address indicia, said return card portion being foldable along said other fold line into juxtaposition with the panel having a window cutout, said primary delivery address area of said detachable postal return card positioned in alignment with the window cutout of said juxtaposed panel to expose the primary delivery address indicia through said window cutout, said body unit being adapted to be folded to form an envelope whereby said return card portion is contained completely within the envelope, and a seal flap connected by a last fold line to said body unit to seal the envelope so that only the primary delivery address area is exposed through said window cutout.

2. A one piece body unit composed of a plurality of panels at least one of which has a window cut-out, said panels being interconnected by fold lines in combination with a detachable card having an address area on a face thereof and being integrally joined to one of said panels along a folded line, a securing flap integral with the edge of the body panel opposite to the edge along which the detachable card is mounted, said securing flap being of substantially reduced width as compared to said detachable card, and adapted to fold over the detachable card after the detachable card has been folded flush against the surface of one of the body panels, whereby said surface of said detachable card, flush against the body panel, is positioned within the envelope so as to be obscured from view until the envelope is opened, said body unit being adapted to be folded into a commercial envelope whereby the card is contained within the envelope with its address area in line with the window cut-out, and a seal flap panel having adhesive affixed thereto to seal the envelope.

References Cited in the file of this patent

UNITED STATES PATENTS

| | | |
|---|---|---|
| 738,943 | Rice | Sept. 15, 1903 |
| 757,801 | Wilt | Apr. 19, 1904 |
| 2,158,528 | Sawdon | May 16, 1939 |
| 2,166,439 | Johnson | July 18, 1939 |
| 2,328,380 | Feder | Aug. 31, 1943 |
| 2,340,700 | Sawdon | Feb. 1, 1944 |
| 2,611,630 | Sawdon | Sept. 23, 1952 |